(12) United States Patent  (10) Patent No.: US 7,775,230 B2
Lau  (45) Date of Patent: Aug. 17, 2010

(54) COLLAPSIBLE HUNTING BLIND

(76) Inventor: Chi Hung Fermi Lau, Room 1729, 17/F., Star House, 3 Salisbury Road, Tsimshatsui, Kowloon (HK)

( * ) Notice: Subject to any disclaimer, the term of this patent is extended or adjusted under 35 U.S.C. 154(b) by 0 days.

(21) Appl. No.: 12/317,124

(22) Filed: Dec. 19, 2008

(65) Prior Publication Data

US 2010/0154281 A1  Jun. 24, 2010

(51) Int. Cl.
E04H 15/40 (2006.01)
(52) U.S. Cl. ............... 135/126; 135/128; 135/119; 135/901; 43/1
(58) Field of Classification Search ......... 135/124–126, 135/128–129, 143–144, 151, 156, 119, 96, 135/901, 907, 135, 147; 220/9.1–9.3; 43/1; 297/184.11, 184.14, 184.15; 114/351
See application file for complete search history.

(56) References Cited

U.S. PATENT DOCUMENTS

| | | | | |
|---|---|---|---|---|
| 3,868,155 A * | 2/1975 | Cherubini | ............ | 135/132 |
| 4,286,612 A * | 9/1981 | Neal et al. | ............ | 135/130 |
| 6,073,643 A * | 6/2000 | Zheng | ............ | 135/125 |
| 6,325,086 B1 * | 12/2001 | Shinner et al. | ............ | 135/126 |
| 6,328,050 B1 * | 12/2001 | McConnell | ............ | 135/137 |
| 6,363,955 B1 * | 4/2002 | Louie | ............ | 135/126 |
| 6,402,220 B2 * | 6/2002 | Allen | ............ | 296/77.1 |
| 6,908,148 B2 * | 6/2005 | Wang et al. | ............ | 297/184.13 |
| 7,140,376 B2 * | 11/2006 | Zheng | ............ | 135/128 |
| 7,357,140 B2 * | 4/2008 | Chu et al. | ............ | 135/128 |
| D574,918 S * | 8/2008 | McAlister | ............ | D21/834 |
| 2005/0092355 A1 * | 5/2005 | Hsu | ............ | 135/125 |
| 2007/0079858 A1 * | 4/2007 | Chu et al. | ............ | 135/126 |

FOREIGN PATENT DOCUMENTS

GB  2340516 A  * 2/2000

* cited by examiner

*Primary Examiner*—Winnie Yip
(74) *Attorney, Agent, or Firm*—Raymond Y. Chan; David and Raymond Patent Firm

(57) ABSTRACT

A collapsible hunting blind includes a blind awning and a collapsible frame to fold the blind awning between a folded position and a setup position. The blind awning comprises two sidewalls, a front wall, a rear wall, and a top wall. The collapsible frame includes a retention frame and two tensional loops. The retention frame is detachably coupling between the sidewalls to retain a distance therebetween, wherein when the retention frame is released from the sidewalls, the sidewalls are adapted to overlap with each other. The two tensional loops are provided at the sidewalls respectively for providing a tensional force thereat at the setup position to stretch out the sidewalls in a tensional manner, wherein when each of the tensional loops is twist-folded to reduce the tensional force at the respective sidewall, the overlapped sidewalls are adapted to twist-fold into a compact structure at the folded position.

15 Claims, 5 Drawing Sheets

COLLAPSIBLE HUNTING BLIND

BACKGROUND OF THE PRESENT INVENTION

1. Field of Invention

The present invention relates to a hunting blind, and more particularly a collapsible hunting blind for quickly converting the hunting blind between a folded position and a setup position.

2. Description of Related Arts

Hunting blinds are considered as one of common tools for hunting that a hunter is covered by the hunting blind from the observation of wild animals and avoids scaring away them. For instance, the hunter hides within the camouflage hunting blind waiting for the deer, the blind can shield the hunter from being seen by the deer so that the hunter is able to wait in the selected location and aim the deer from the window of the blind. Not only for hunting, but also the hunting blind can be used for research. Another example is a researcher hiding inside the blind to observe the wild Clouded Leopard's life.

Although different kinds hunting blind for hunters with different shapes are available, most of them contain the following drawbacks.

When searching of wildlife, hunters usually need to carry a couple of stuffs with them such as a gun, water storage, a telescope and etc. Thus, people are really looking forward to find hunting blind which is easy to assemble and disassemble, and is really light. However, the problem of convenience hunting blind is that the structure of the hunting blind is usually complicated which maximum the assembling time to set up the hunting blind. In other words, the body of the blind is usually more than three pieces, and each of them has to assemble together through different methods. While the hunter tries to assemble the hunting blind, it is very difficult for people to find a truly easy way to set it up. To make matters worse, the weight of some hunting blind is very heavy. It is a struggle for people to always carry them with themselves. Furthermore, people need to apply relatively more force to assemble and disassemble the hunting blind.

On the other hand, the wind-proof ability of some hunting blinds is bad. Especially when it is used in windy days, the unstable structure makes the hunting blind shake in the windy days. Moreover, the air of some inner hunting blinds is stuffy while the hunter is standing inside the blind. Waterproof ability is another question. As a matter of fact, hunters prefer to use the hunting blind which is durable and waterproof, most important of all, the requirement of being small, light weight, and more convenient for people to assemble and disassemble of the hunting blind is the trend for hunter to pursuits on hunting blind.

There exists a great demand for a light in weight, more portable and easy to be set up hunting blind, so that the hunting blind can be readily carried to a selected place such as a spot in the forest or jungle, and carry the hunting blind from one place to another in the hope of being at a better location. Frequently, to facilitate the mobility, the hunting blind should be capable for being collapsed into a compact size and simply operated by one person.

Accordingly, the exist hunting blinds are still not capable for the above demands. The foldable hunting blinds in the market now are usually complicated to be set up and can be barely operated by one himself or herself.

SUMMARY OF THE PRESENT INVENTION

A main object of the present invention is to provide a collapsible hunting blind so that the hunting blind can be easily folded and unfolded to a setup position by one person.

Another object of the present invention is to provide a collapsible hunting blind, wherein the folding operation of the hunting blind is simple and easy by overlapping two sidewalls of the hunting blind and twist-folding the sidewalls into a compact structure.

Another object of the present invention is to provide a collapsible hunting blind, wherein the hunting blind is automatically unfolded into the setup position by means of the tensional force to provide a quick and simple unfolding operation of the hunting blind.

Another object of the present invention is to provide a collapsible hunting blind, wherein the sidewalls of the hunting blind are tri-folded into a plurality of planar sections being overlain one another and being interlocked with each other at the storage position, so as to prevent the folded hunting blind being unfolded accidentally.

Another object of the present invention is to provide a collapsible hunting blind, wherein the hunting blind can be folded into a compact size, so that the hunter is able to carry the hunting blind as one of the hunting equipments and carry the blind from one to another place in the hope of being at a better location.

Another object of the present invention is to provide a collapsible hunting blind, wherein the hunting blind has a trapezoid shape so that the hiding area within the bind increases in height and decrease in width from bottom to top, such that the hunting blind has a stable structure and the hunter has enough space kneeing on the floor and standing up to get a better shoot or view.

Another object of the present invention is to provide collapsible hunting blind, wherein the structural configuration of the hunting blind is simple by providing two tensional loops at the sidewalls of the hunting blind so as to simplify manufacturing steps and decrease manufacturing cost.

Another object of the present invention is to provide a collapsible hunting blind, wherein the windows are provided entirely around the blind so that the windows can be opened to have a clear view to shoot through, take pictures, or observe the wild animals with a telescope.

Another object of the present invention is to provide a collapsible hunting blind with a door, wherein the door opening is from the bottom to the top of the blind with a zip opening attached along the rim of the door, so that the hunter can easily get in and out of the hunting blind.

Another object of the present invention is to provide a collapsible hunting blind, wherein the hunting blind has polarity stakes for digging into the ground and engaged with the corner of the hunting blind, so that the hunting blind can be stably fixed on the ground.

Another object of the present invention is to provide a collapsible hunting blind, wherein the hunting blind has a camouflage painting so that the blind is relatively more unobvious to the wild animals for matching the color of the environment to have relatively better cover.

Accordingly, in order to accomplish the above objects, the present invention provides a collapsible hunting blind which comprises a blind awning and a collapsible frame adapted to fold the blind awning between a folded position and a setup position.

The blind awning comprises two sidewalls, a front wall, a rear wall, and a top wall and defining a hiding area within the sidewalls, the front wall, the rear wall and the top wall for a hunter hiding within the hiding area.

The collapsible frame comprises a retention frame and two tensional loops. The retention frame is detachably coupling between the sidewalls to retain a distance therebetween at the setup position, wherein when the retention frame is released from one of the sidewalls, the sidewalls are adapted to overlap with each other at the folded position. The two tensional loops are provided at the sidewalls respectively for providing a tensional force thereat at the setup position to stretch out the sidewalls in a tensional manner, wherein when each of the tensional loops is twist-folded to reduce the tensional force at the respective sidewall of the blind awning, the sidewalls in an overlapped manner are adapted to twist-fold into a compact structure at the folded position.

These and other objectives, features, and advantages of the present invention will become apparent from the following detailed description, the accompanying drawings, and the appended claims.

DETAILED DESCRIPTION OF THE PREFERRED EMBODIMENT

Figure 1:
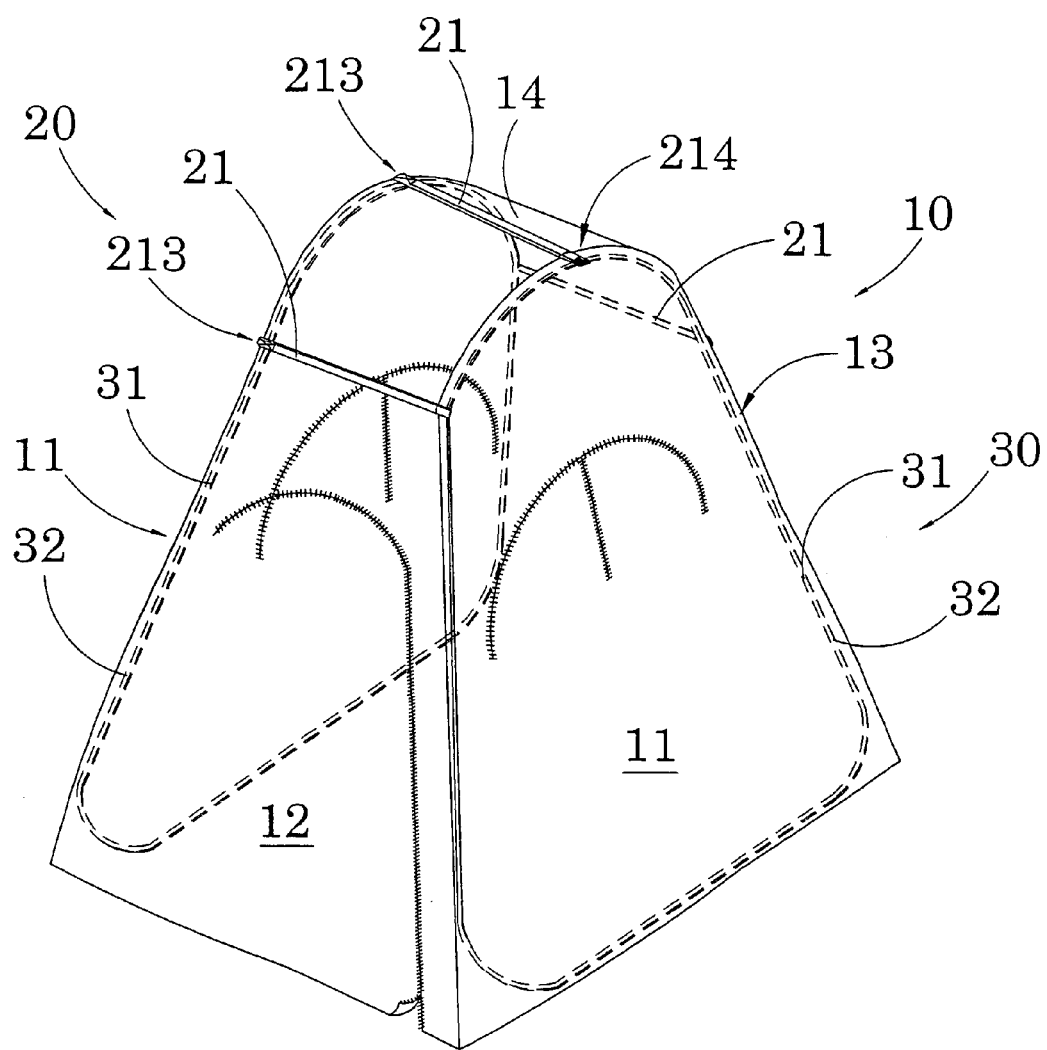
FIG. 1 is the perspective view of a collapsible hunting blind according to a preferred embodiment of the present invention, illustrating the setup position of the hunting blind.

Referring to FIG. 1 of the drawings, a collapsible hunting blind according to a preferred embodiment of the present invention is illustrated, wherein the collapsible hunting blind comprises a blind awning 10 and a collapsible frame adapted to fold the blind awning 10 between a folded position and a setup position.

The blind awning 10 comprises two sidewalls 11, a front wall 12, a rear wall 13, and a top wall 14 formed a hiding area within the sidewalls 11, the front wall 12, and the rear wall 13 for a hunter hiding within the hiding area. Accordingly, the blind awning 10 has a camouflage painting at the outer surface thereof so that the blind awning 10 is relatively more unobvious to the wild animals for matching the color of the environment to have relatively better cover.

Accordingly, the sidewalls 11, the front wall 12 and the rear wall 13 have a trapezoid shape, wherein the hiding area increases in height and decreases in width, so that the hunter has enough space when he or she squats on the ground preparing and stands up for a nice shoot.

According to the preferred embodiment, the top wall 14 is integrally extended between the front wall 12 and the rear wall 13 of the blind awning 10 to form a one piece structure, so that the one piece structure can simplify the process of manufacture.

As shown in FIG. 1, a plurality of window screens are provided with the blind awning 10, wherein each of the window screens can be opened or closed via a zipper for observation and air circulation, so that the hunter or the observer can have a clear view to shoot through, take pictures, or observe the wild animals with a telescope. Accordingly, a door with a zip opener is further provided at the front wall 14 for the hunter getting in and out the hunting blind easily. The collapsible hunting blind further comprises a plurality of polarity stakes provided at the bottom corners of the blind awning 10 for digging into the ground, so that the blind awning 10 can be stably fixed on the ground.

The collapsible frame comprises a retention frame 20 coupling between the two sidewalls 11 to retain a distance therebetween at the setup position, and two tensional loops 30 provided along the peripheral edge of the sidewalls 11 respectively to stretch out the sidewalls 11 of the blind awning 10 in a tensional manner at the setup position.

The retention frame 20 comprises at least two retention arms 21, preferably three retention arms 21, adapted to retain the distance between two sidewalls 11 of the blind awning 10 at the setup position. The two retention arms 21 are positioned at two sides of the top wall 14 respectively, wherein the third retention arm 21 can be positioned at the apex of the sidewall 11.

Each of the retention arms 21 has an affixing end 213 coupling with one of the sidewalls 11 and an opposed detachable end 214 detachably coupling with another sidewall 11, wherein when the detachable end 214 of the retention arm 21 is detached from the respective sidewall 11, the retention frame 20 is released between the sidewalls 11 so that the sidewalls 11 are adapted to overlap each other.

Figure 2:
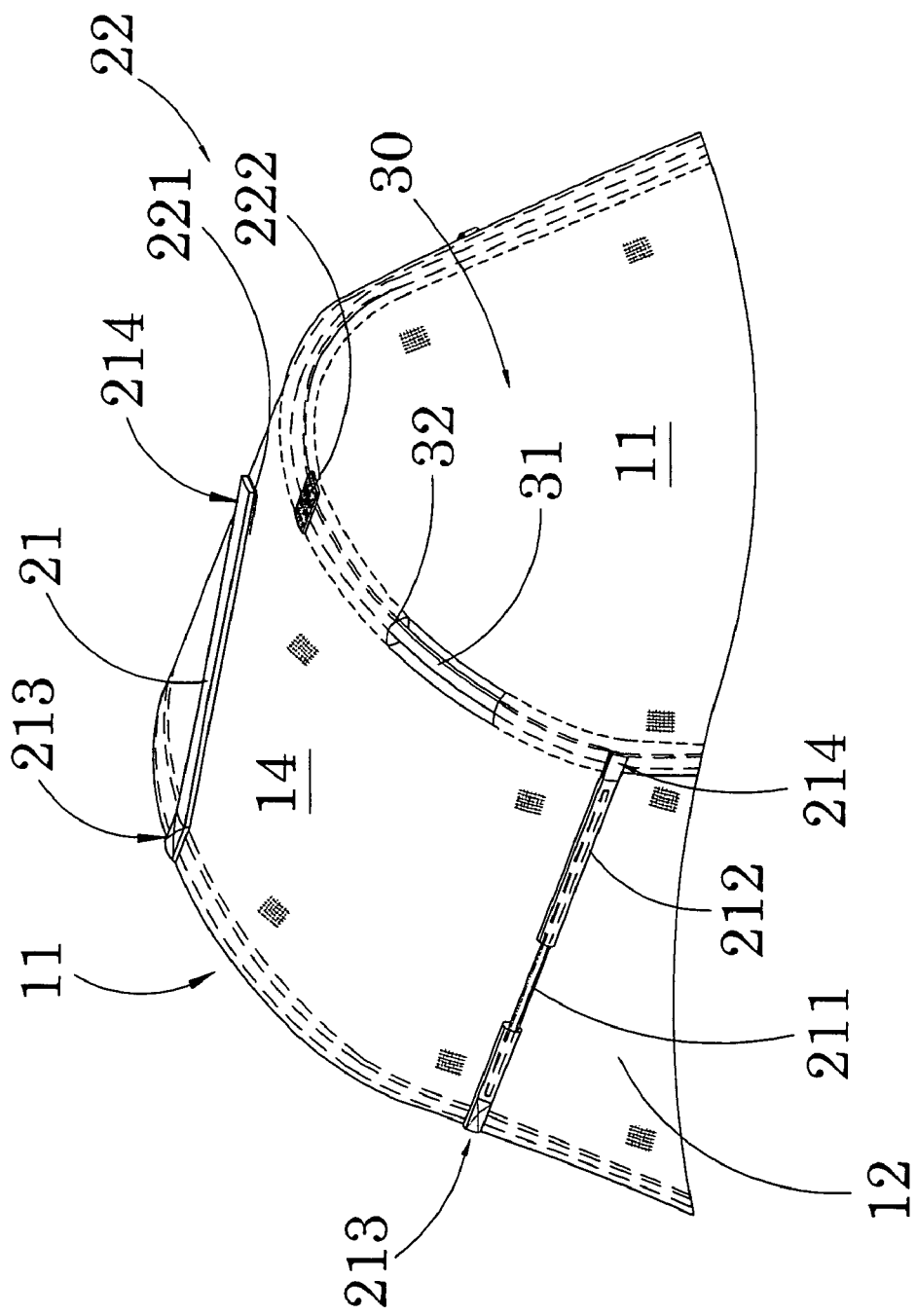
FIG. 2 is a partially sectional view of the collapsible frame of the collapsible hunting blind according to the preferred embodiment of the present invention, illustrating the structural configuration of the retention frame and the tensional loops.

In particularly, the retention arm 21 comprises an elongated rod 211 to provide the strength for retaining the distance between two sidewalls 11, a retention pocket 212 for receiving the elongated rod 211 therein, wherein one end of the retention pocket 212 forms the affixing end 213 of the retention arm 21 to securely affix to the respective sidewall 11 while another end of the retention pocket 212 forms the detachable end 214 of the retention arm 21 to detachable affix to another sidewall 11 via a fastening unit 22, as shown in FIG. 2. Accordingly, the fastening unit 22 comprises a first fastener 221, such as a hook fastener, provided at the detachable end 214 of the retention arm 21 and a second fastener 222, such as a loop fastener, provided at the respective sidewall 11 to detachably fasten with the first fastener 221 such that the retention arm 21 is extended between the two sidewalls 11 to retain the distance therebetween.

It is appreciated that two ends of the retention arm 21 can be detachably affixed to the sidewalls 11 respectively via the fastening unit 22. For preventing the retention arm 21 from being lost or misplaced between the sidewalls 11, one end of the retention arm 21 is preferred to permanently affix at the sidewall 11 while another end of the retention arm 21 is selectively affix to another sidewall 11.

As shown in FIG. 2, each of the tensional loops 30 comprises a resilient wire 31 which is coupled end-to-end to form a loop structure and is securely attached to the peripheral edge of the respective sidewall 11, such that the resilient wire 31 normally stretches out the sidewall 11 in a tensional manner at the setup position while the resilient wire 31 is adapted to twist-fold the sidewall 11 into a plurality of planar sections 101 being overlain one another at the folded position.

Each of the sidewalls 11 has a tubular sleeve 32 provided along the peripheral edge to receive the resilient wire 31 within the tubular sleeve 32 to retain the resilient wire 31 around the peripheral edge of the sidewall 11. Accordingly, the resilient wire 31 will normally provide a tensional stretching force to evenly stretch out the entire sidewall 11 in a tensional manner. Since the sidewall 11 has the trapezoid shape, the resilient wire 31 is retained at the trapezoid shape at the peripheral edge of the sidewall 11.

Figure 3:
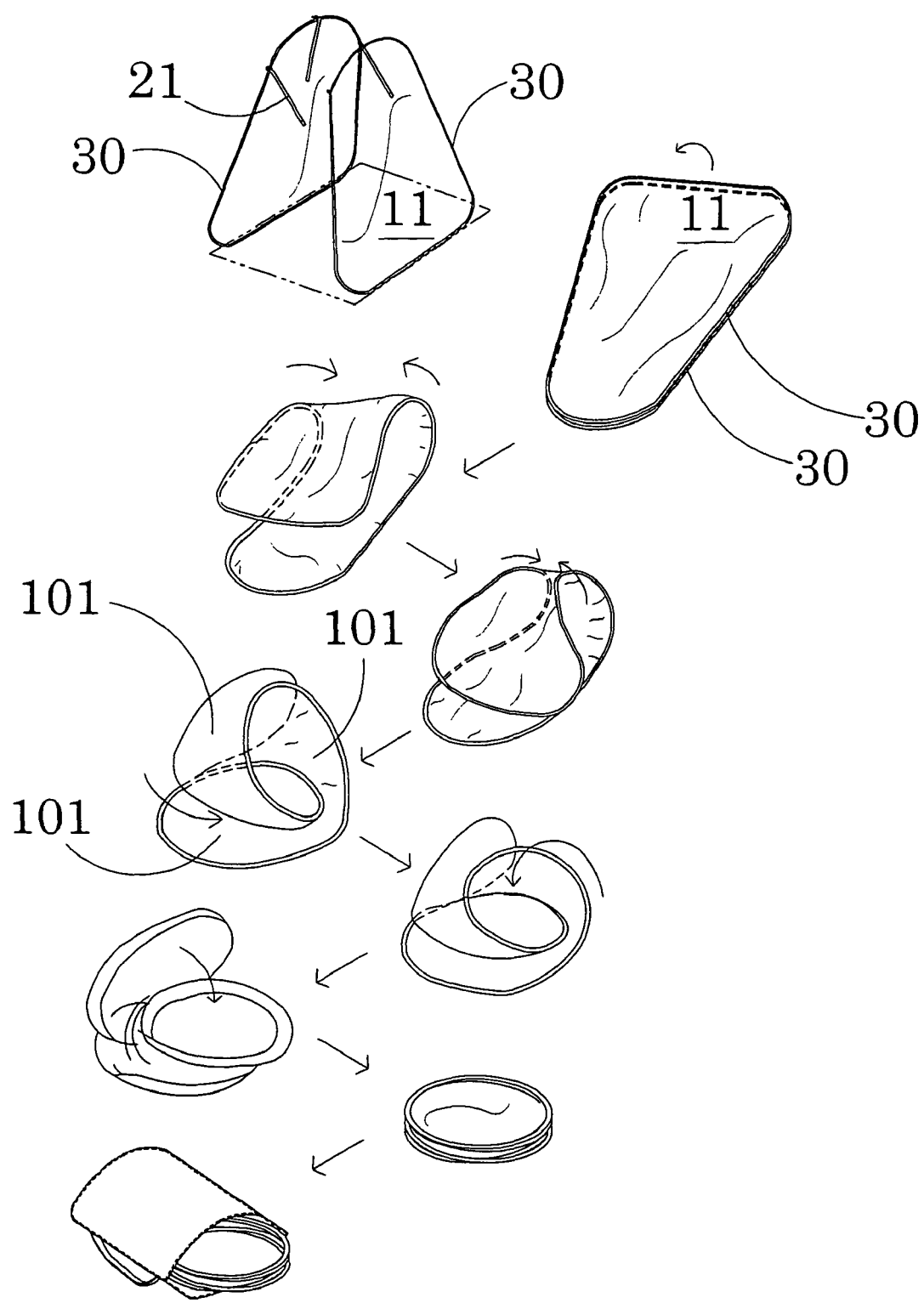
FIG. 3 is a schematic view of the collapsible hunting blind according to the preferred embodiment of the present invention, illustrating the folding operation of the collapsible hunting blind.

FIG. 3 illustrates the folding operation of the collapsible hunting blind. Accordingly, in order to fold up the collapsible hunting blind should detach the detachable ends 214 of the retention arms 21 from the respective sidewall 11 such that the two sidewalls 11 are adapted to overlap with each other. In other words, the two tensional loops 30 are then overlapped with each other that the two overlapped sidewalls 11 form a trapezoid panel. When the bottom edge of the trapezoid panel is folded towards the top edge of the trapezoid panel, the two side edges of the trapezoid panel are bent into two U-shaped wires. Then, by further folding the bottom edge of the trapezoid panel towards the center portion thereof, the two U-shaped wires are automatically twisted to form two circular loops and the top edge of the trapezoid panel is automatically formed a third circular loops. In other words, three planar sections 101 of each of the sidewalls 11 are defined at the three circular loops. The three circular loops are then being overlain one another and interlocked with each other to fold up the blind awning 10. The collapsible hunting blind of the present invention is folded into a compact size at the folded position and stored into a carry bag to be carried around. It is worth to mention that the sidewalls 11 of the blind awning 10 are tri-folded into the planar sections 101 being overlain one another and being interlocked with each other at the storage position, so as to prevent the folded hunting blind being unfolded accidentally.

In order to unfold the collapsible hunting blind, the hunter can pull out one of the circular loops to release the interlocking structure of the tensional loops 30, such that the tensional loops 30 will automatically stretch out the sidewalls 11 in a tensional manner. Therefore, the hunter is able to attach the detachable ends 214 of the retention arms 21 to the corresponding sidewall 11 to retain the distance between the sidewalls 11.

Figure 4:
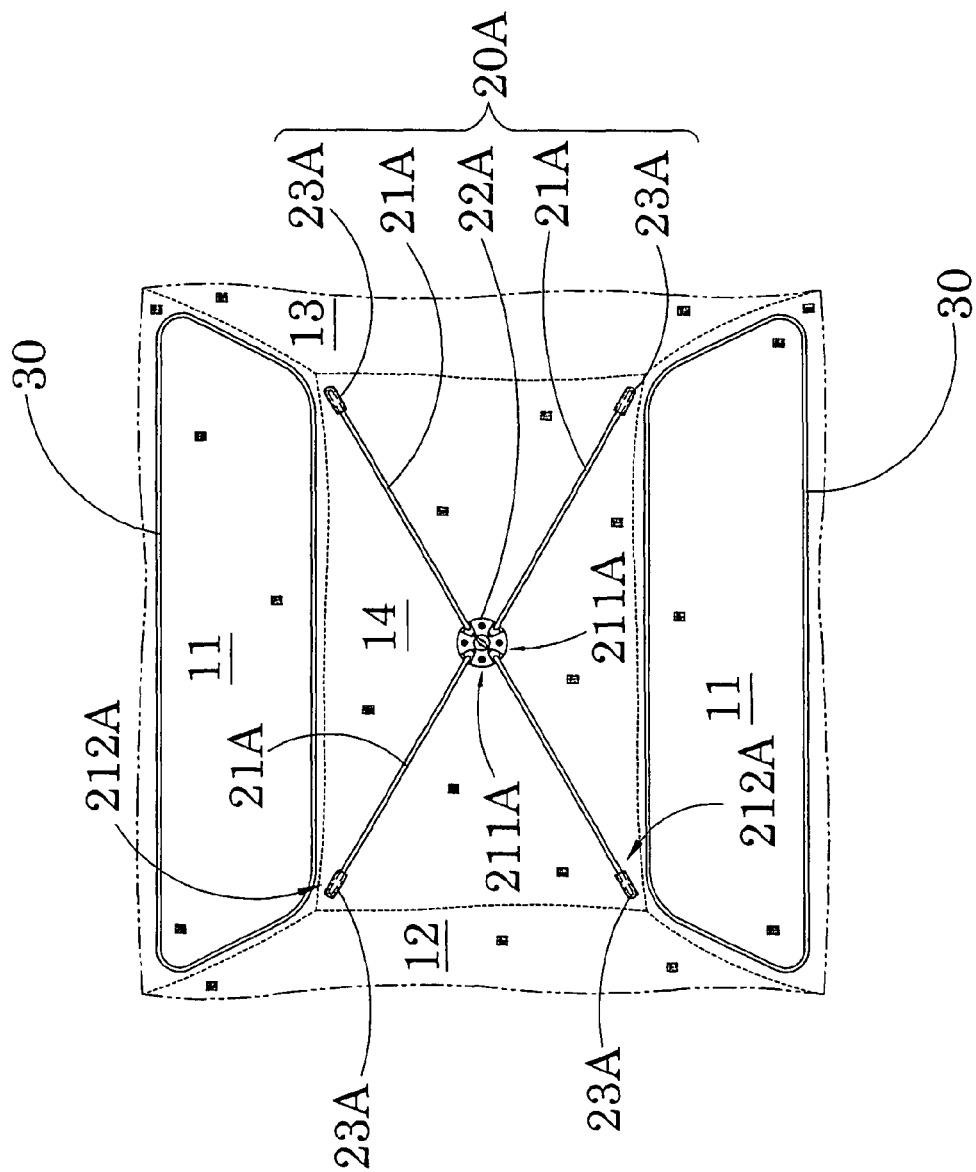
FIG. 4 is a top view illustrating an alternative mode of the retention frame at the top wall of the collapsible hunting blind according to the preferred embodiment of the present invention.
Figure 5:
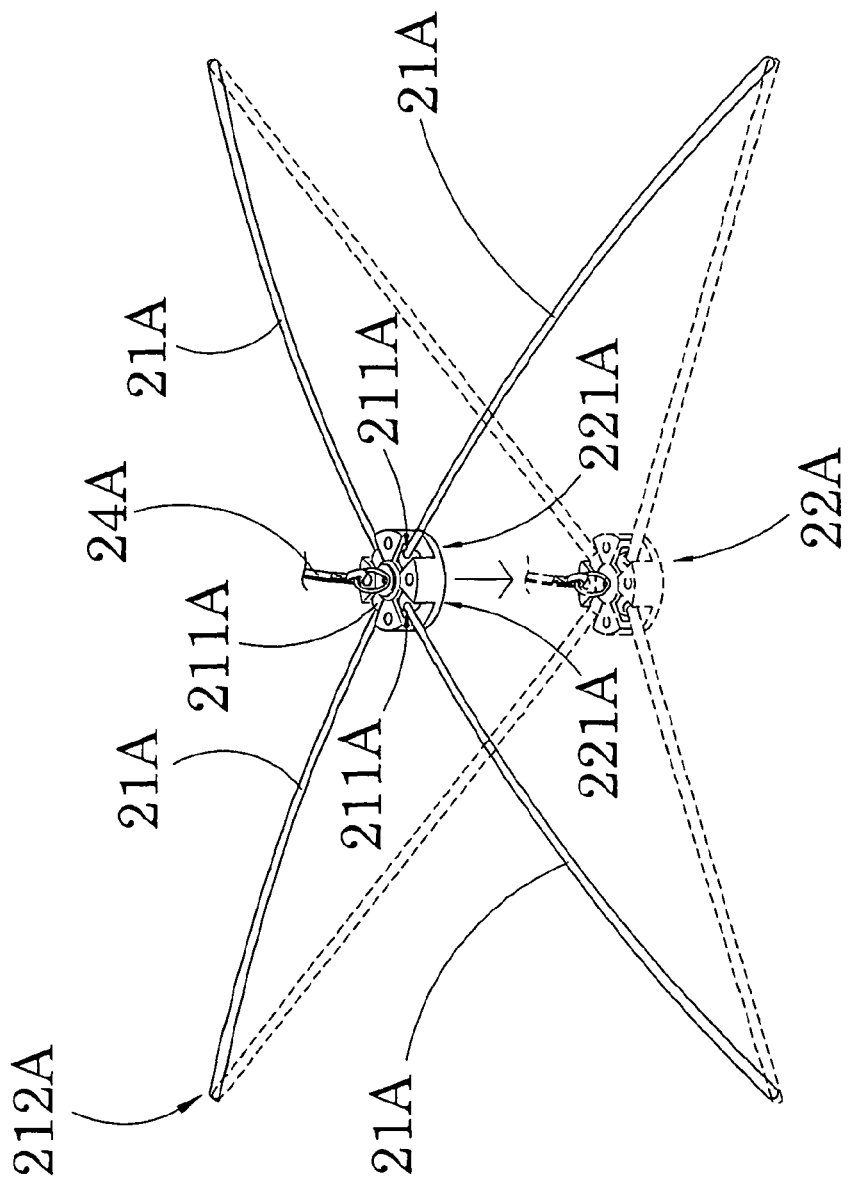
FIG. 5 is a perspective view of the alternative retention frame of the collapsible hunting blind according to the preferred embodiment of the present invention, illustrating the top wall being upwardly popped at the setup position.

FIGS. 4 and 5 illustrate an alternative mode of the retention frame 20A to retain the distance between the sidewalls 11 of the blind awning 10. Accordingly, the retention frame 20A, which is coupled at the inner side of the top wall 14 of the blind awning 10, comprises a retention member 22A and a plurality of top flexible retention arms 21A radially extended from the retention member 22A, wherein each of the flexible retention arms 21A has an inner end 211A pivotally coupling with the retention member 22A and an outer end 212A extended to couple at a corner portion of the top wall 14, in such a manner that when the actuation member 22A is pulled upwardly, the flexible retention arms 21A are bent upwardly to pop the top wall 14 in a tensionally stretchable manner so as to retain the distance between the sidewalls 11.

Accordingly, the flexible retention arms 21A are diagonally extended at the top wall 14 to form a "X" structure. As shown in FIG. 5, a plurality of holding pockets 23A are provided at the corner portions of the top wall 14 for receiving the outer ends 212A of the flexible arms respectively so as to retain the retention frame 20A in position.

The actuation member 22A is affixed to a center of the top wall 14 and has a plurality of engaging slots 221A coupling with the inner ends 211A of the flexible retention arms 21A with a ball-and-socket joint structure, as shown in FIG. 5. A pulling strap 24A is extended from the actuation member 22A at an outer side of the top wall 14 such that when the pulling strap 24A is pulled upwardly, the actuation member 22A is pulled to pop out the top wall 14 through the flexible retention arms 21A to retain the distance between the sidewalls 11. When the retention member 22A is pulled downwardly, the flexible retention arms 21A are bent downwardly and folded in a bundle form such that the two sidewalls 11 are adapted to overlap with each other.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A collapsible hunting blind, comprising:

a bottomless blind awning comprising two sidewalls, a front wall, a rear wall, and a top wall without any bottom wall, wherein a hiding area is defined within said sidewalls, said front wall, and said rear wall for a hunter hiding within said hiding area; and a collapsible frame, which is adapted to fold between a folded position and a setup position, comprising:

two tensional loops provided at said sidewalls respectively for providing a tensional force thereat at said setup position to stretch out said sidewalls in a tensional manner, wherein when each of said tensional loops is twist-folded to reduce said tensional force at said respective sidewall of said blind awning, said sidewalls in an overlapped manner are adapted to twist-fold into a compact structure at said folded position, wherein each of said tensional loops comprises a resilient wire which is coupled end-to-end to form a loop structure and is securely attached to a peripheral edge of said respective sidewall, such that said resilient wire normally stretches out said sidewall in a tensional manner at said setup position while said resilient wire is adapted to twist-fold said sidewall into a plurality of planar sections being overlain one another at said folded position, and wherein each of said front and rear walls has a trapezoid shape such that when said front and rear walls are unfolded at said setup position, said hiding area increases in height and decreases in width from bottom to top; and a retention frame detachably coupling between said sidewalls to retain a distance therebetween at said setup position, wherein said retention frame comprises at least two elongated retention arms each having an affixing end coupling with an upper portion of one of said sidewalls and an opposed detachable end detachably coupling with said another sidewall, wherein when said detachable ends of said retention arms are connected to said respective sidewall, said retention frame is retained between said sidewalls to support said collapsible frame and said blind awning in said setup position, wherein when said detachable ends of said retention arms are detached from said respective sidewall, said retention frame is released between said sidewalls and said sidewalls are adapted to overlap with each other at said folded position.

2. The collapsible hunting blind, as recited in claim 1, wherein each of said retention arm comprises an elongated rod to provided a strength for retaining said distance between said two sidewalls, a retention pocket for receiving said elongated rod therein and a fastening unit, wherein one end of said retention pocket forms said affixed end of said retention arm to securely affix said respective sidewall while another end of said retention pocket forms said detachable end of said retention arm to detachable affix to said another sidewall via said fastening unit, wherein each of said fastening unit comprises a first fastener provided at said detachable end and a second fastener provided at said respective sidewall to detachably fasten with said first fastener so as to extend said retention arm between said two sidewalls to retain said distance therebetween.

3. The collapsible hunting blind, as recited in claim 2, said first fastener and said second fastener are hook and loop fasteners respectively.

4. The collapsible hunting blind, as recited in claim 3, wherein each of said sidewalls has a trapezoid shape such that when said sidewalls are stretched at said setup position, said hiding area increases in height and decreases in width from bottom to top.

5. The collapsible hunting blind, as recited in claim 4, wherein said sidewalls are tri-folded into said planar sections in such a manner that each of said sidewalls is overlain by an adjacent sidewall, wherein each of said sidewalls are interlocked with each other at said storage position.

6. The collapsible hunting blind, as recited in claim 3, wherein said sidewalls are tri-folded into said planar sections in such a manner that each of said sidewalls is overlain by an adjacent sidewall, wherein each of said sidewalls are interlocked with each other at said storage position.

7. The collapsible hunting blind, as recited in claim 2, wherein each of said sidewalls has a tubular sleeve provided along said peripheral edge to receive said resilient wire within said tubular sleeve.

8. The collapsible hunting blind, as recited in claim 2, wherein each of said sidewalls has a trapezoid shape such that when said sidewalls are stretched at said setup position, said hiding area increases in height and decreases in width from bottom to top.

9. The collapsible hunting blind, as recited in claim 8, wherein said sidewalls are tri-folded into said planar sections in such a manner that each of said sidewalls is overlain by an adjacent sidewall, wherein each of said sidewalls are interlocked with each other at said storage position.

10. The collapsible hunting blind, as recited in claim 2, wherein said sidewalls are tri-folded into said planar sections in such a manner that each of said sidewalls is overlain by an adjacent sidewall, wherein each of said sidewalls are interlocked with each other at said storage position.

11. The collapsible hunting blind, as recited in claim 1, wherein each of said sidewalls has a tubular sleeve provided along said peripheral edge to receive said resilient wire within said tubular sleeve.

12. The collapsible hunting blind, as recited in claim 11, wherein each of said sidewalls has a trapezoid shape such that when said sidewalls are stretched at said setup position, said hiding area increases in height and decreases in width from bottom to top.

13. The collapsible hunting blind, as recited in claim 11, wherein said sidewalls are tri-folded into said planar sections in such a manner that each of said sidewalls is overlain by an adjacent sidewall, wherein each of said sidewalls are interlocked with each other at said storage position.

14. The collapsible hunting blind, as recited in claim 1, wherein each of said sidewalls has a trapezoid shape such that when said sidewalls are stretched at said setup position, said hiding area increases in height and decreases in width from bottom to top.

15. The collapsible hunting blind, as recited in claim 1, wherein said sidewalls are tri-folded into said planar sections in such a manner that each of said sidewalls is overlain by an adjacent sidewall, wherein each of said sidewalls are interlocked with each other at said storage position.

* * * * *